United States Patent
Pischinger et al.

[11] Patent Number: 6,101,992
[45] Date of Patent: Aug. 15, 2000

[54] FLUID-BRAKED ELECTROMAGNETIC ACTUATOR

[75] Inventors: Martin Pischinger; Raimund Tensing, both of Aachen, Germany

[73] Assignee: FEV Motorentechnik GmbH & Co. KG, Aachen, Germany

[21] Appl. No.: 09/033,074

[22] Filed: Mar. 2, 1998

[30] Foreign Application Priority Data

Feb. 28, 1997 [DE] Germany ............ 297 03 584 U

[51] Int. Cl.[7] ............................................. F01L 9/04

[52] U.S. Cl. .................... 123/90.11; 251/129.01; 335/240

[58] Field of Search ............ 123/90.11; 335/240; 251/129.01

[56] References Cited

U.S. PATENT DOCUMENTS 5,832,883  11/1998  Bae ........................... 123/90.11

Primary Examiner—Noah P. Kamen
Attorney, Agent, or Firm—Venable; Gabor J. Kelemen

[57] ABSTRACT

An electromagnetic actuator includes an electromagnet having a pole face, an energized state for generating an electromagnetic force and a de-energized state; and an armature movable towards and away from the pole face in a travel path extending from a first end position remote from the pole face to a second end position at the pole face. The armature assumes the second end position in the energized state of the electromagnet. A return spring urges the armature away from the pole face and toward the first end position. Further, a fluid damping unit is provided for braking a motion of the armature along a terminal portion of its travel path shortly before its arrival into at least one of the end positions for effecting a soft arrival of the armature into such end position.

15 Claims, 6 Drawing Sheets

FLUID-BRAKED ELECTROMAGNETIC ACTUATOR

CROSS REFERENCE TO RELATED APPLICATION

This application claims the priority of German Application No. 297 03 584.3 filed Feb. 28, 1997, and German Application No. 198 03 896.8 filed Jan. 31, 1998, which are incorporated herein by reference.

BACKGROUND OF THE INVENTION

This invention relates to electromagnetic actuators that essentially include at least one electromagnet and an armature which is coupled to a setting member to be operated. The armature, upon energization of the electromagnet, is movable against the force of a resetting spring. Such actuators are characterized by high switching speeds. The electromagnets, however, involve the problem that as the armature approaches the pole face of the electromagnet (that is, the distance between armature and pole face continuously decreases), the magnetic force affecting the armature increases. As a result, the armature is further accelerated and thus impacts on the pole face with high speed. Apart from noise generation, rebound phenomena may occur, that is, the armature may move away from the pole face at least for a short period until it eventually assumes its position of rest at the pole face. This phenomenon may adversely affect the functioning of the setting member, resulting in significant operational disturbances, particularly in actuators which have a high switching frequency.

It is therefore desirable to ensure that the impact speed has a value in the order of magnitude of 0.1 m/s. It is of importance that such small impact speeds are ensured even under real operating conditions including all the relevant stochastic fluctuations and interfering external influences such as jars or the like.

SUMMARY OF THE INVENTION

It is an object of the invention to provide an improved electromagnetic actuator of the above-outlined type in which the armature is guided into its seat at the pole face of the electromagnet with a small impact speed.

This object and others to become apparent as the specification progresses, are accomplished by the invention, according to which, briefly stated, the electromagnetic actuator includes an electromagnet having a pole face, an energized state for generating an electromagnetic force and a de-energized state; and an armature movable towards and away from the pole face in a travel path extending from a first end position remote from the pole face to a second end position at the pole face. The armature assumes the second end position in the energized state of the electromagnet. A return spring urges the armature away from the pole face and toward the first end position. Further, a fluid damping unit is provided for braking a motion of the armature along a terminal portion of its travel path shortly before its arrival into at least one of the end positions for effecting a soft arrival of the armature into such end position.

Since the fluid damping unit has an effect on the armature only shortly before the impingement of the armature against the pole face in one switching position and/or against a stop face of another type defining a switching position, it is ensured that the high switching speeds made possible with an electromagnetic actuator are not adversely affected. The armature is braked in its motion only in the terminal phase of its approach to the pole face, particularly the pole face of the electromagnet, so that the armature arrives in a "soft" manner into contact with the pole face. The circumstance is advantageously utilized that as the armature approaches the pole face of an electromagnet and consequently the distance between the armature and the pole face decreases, the magnetic force exerted on the armature increases (assuming the current intensity remains the same). Such an increasing magnetic force opposes the "braking" force of the fluid damping unit. Since the moved masses of such a fluid damping unit are significantly smaller than the moved masses of the actuator (essentially the armature, the shifting element and, according to the design, also the setting element to be operated), the movable part of the fluid damping unit is very significantly accelerated. Accordingly, the armature is braked by the damping effect so that no rebound occurs. As the speed of the movable part of the fluid damping unit increases, the counterforce exerted by the fluid damping unit on the armature is also augmented. Thereafter a uniform speed decrease and thus a uniform decrease of the counterforce occur, until the armature impinges on the pole face which occurs in a "soft" manner. As soon as the armature assumes its position at the pole face and is held by the magnetic force, only the resetting force of the resetting spring acts in the opposite direction. As pressure fluid a gaseous, flowable medium may be used. It is preferred, however, to use a liquid as the pressurized fluid.

The pressurized fluid supply device has the function of replacing, during resetting, the fluid quantity which was displaced earlier during the braking operation (as the armature approached and abutted the pole face). This may be achieved by an external pressurized fluid supply device which, for example, in a reciprocating piston-type engine, is present in any event. It is, however, also feasible to provide the fluid damping unit as an independent system. In such an arrangement the fluid volume displaced during the braking operation is guided into an integrated receiving chamber which may be formed essentially by an elastic diaphragm device. From the elastic diaphragm device the fluid is again drawn back when the movable component of the fluid damping unit is pressed back into its initial position by the resetting spring.

According to a preferred embodiment of the invention, the damping unit includes a cylinder and a throttling piston which are movable relative to one another from a position of rest against the force of a holding spring. Further, an abutment is provided which defines the position of rest and a pressurized fluid channel is provided which opens into the cylinder chamber and which contains a check valve. Further, a pressurized fluid return opening is situated on that side of the throttling piston which is oriented away from the cylinder chamber and is opened when the piston moves out of its position of rest. By providing an abutment which determines the position of rest, the movable component of the damping unit may be adjusted with precision in its position of rest so that the length of the path traveled by the plunger element under the damping effect may be set in an accurate manner. The throttling piston may be guided either closely along the cylinder wall and may be provided with throttle bores or may have a defined clearance between its outer circumference and the cylinder wall. Such a clearance acts as a throttle for the pressurized fluid. It is furthermore feasible, in case of a relatively large clearance between the piston circumference and the cylinder wall when practically no throttle effect appears, to dimension the pressurized fluid return opening such that the desired throttling is effected at that location. The holding spring must be so designed that the mass of the moved part of the damping unit (for example, the cylinder) is, during a return motion of a plunger element (which is connected with the armature), returned in the shortest possible time into its position of rest to ensure a superior damping effect even at high switching frequencies. Because of the short travel lengths involved in such constructions of the movable part of the fluid damping unit, only small quantities of pressurized fluid are needed. The check valve ensures that upon a return motion into the position of rest, the fluid volume displaced from the cylinder during the damping motion is resupplied into the cylinder chamber from the pressurized fluid supply device.

According to a further preferred embodiment of the invention, the damping element cooperates with the free end of the plunger element and is in alignment with its axis of motion. In such an arrangement the system as a whole has the minimum necessary movable parts.

According to another preferred embodiment of the invention the damping unit is arranged at a lateral distance from the motion axis of the plunger element. Further, between the plunger element and the damping unit a transmission element is provided. Shortly before the armature and the plunger element reach the associated switching position, the transmission element enters into an operational relationship with the plunger element. Such an embodiment is particularly advantageous when the setting member is positioned in the immediate vicinity of the actuator and is operated directly by the plunger element along the axis of motion of the plunger element. The transmission element is advantageously formed by a transmission lever which is spring-biased against the movable part of the damping unit.

An actuator according to the invention is advantageously used as the operator of at least one cylinder valve in a reciprocating piston-type internal-combustion engine. Such a cylinder valve actuator has two spaced electromagnets between which an armature is movable against the force of resetting springs. The armature is connected with a plunger element which is operatively connected with the cylinder valve. Further, the plunger element is associated, at least in relation to one switching position (such as the closed or the open position of the cylinder valve), with a damping unit and further, the damping unit is coupled with an external oil supply device for providing the pressurized fluid. Expediently, in this construction the damping unit associated with the electromagnet operating in the "valve closing" direction is arranged as an axial continuation of the plunger element. The damping unit associated with the electromagnet which operates in the "valve opening" direction is arranged at a lateral distance from the axis of motion of the plunger element and the cylinder valve. By forming the transmission element between the plunger element and the damping unit as a transmission lever, it is ensured that independently from the dimensional inaccuracies upon installation of the damping unit, the cylinder valve is, in its closed position, out of contact with the damping unit and thus an unintentional lifting of the valve from its closed position is avoided.

DESCRIPTION OF THE PREFERRED EMBODIMENTS

Figure 1:
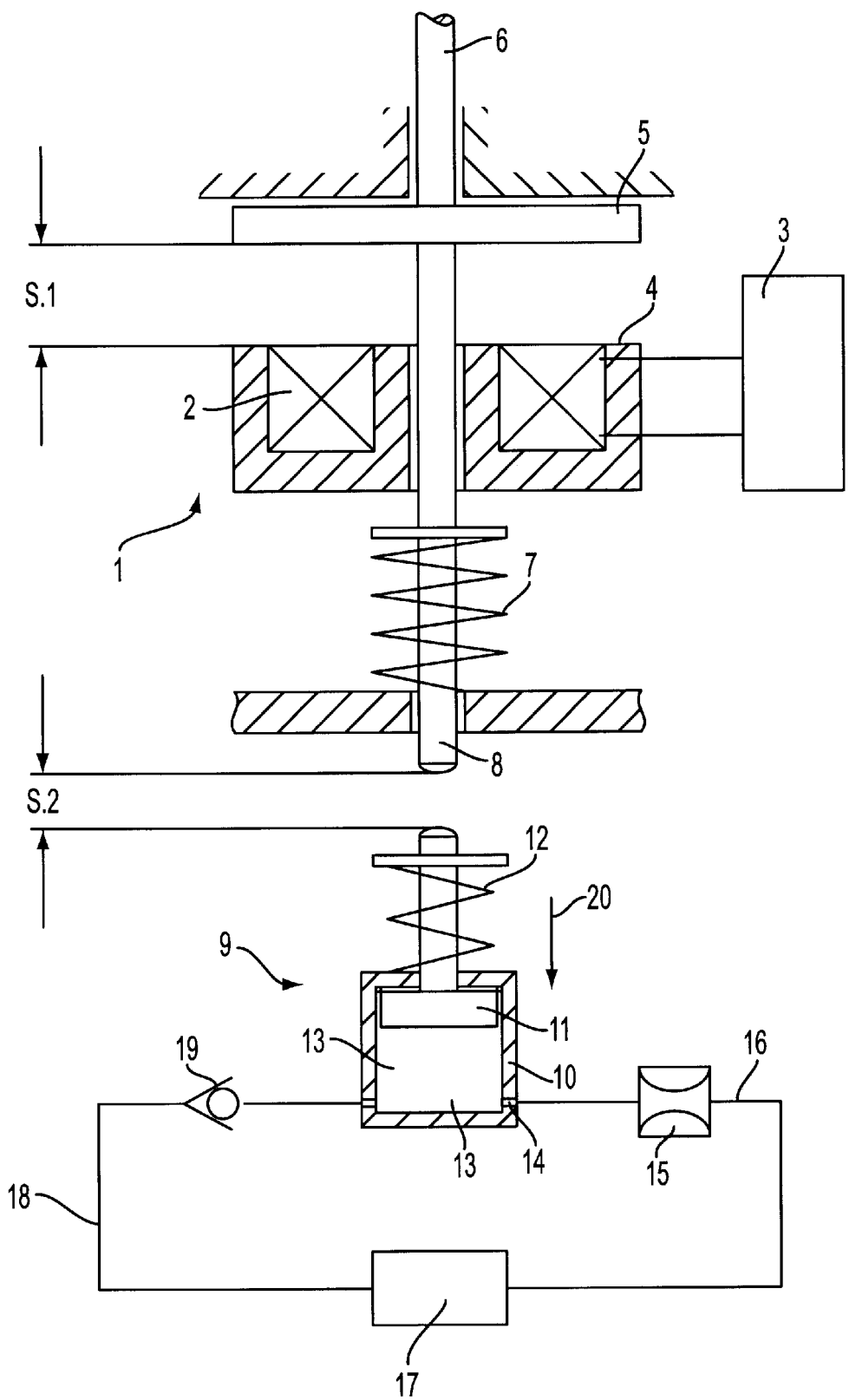
FIG. 1 is a schematic sectional view of an electromagnetic actuator including a fluid damping (dashpot) unit, showing structural and operational principles.

FIG. 1 illustrates in principle the electromagnetic actuator according to the invention. The actuator includes an electromagnet 1 whose coil 2 may be supplied with current from a controllable current supply 3. The pole face 4 of the electromagnet 1 cooperates with an armature 5 which is coupled with a plunger element 6 and which, in an energized state of the coil 2, may be brought into contact with the pole face 4 against the force of a resetting spring 7. The plunger element 6 is coupled with a non-illustrated setting member which may be reciprocated by virtue of the back-and-forth motion of the armature 5. The actuator is depicted in its first switching position shown in FIG. 1 in a de-energized state of the coil 2. If the coil 2 is supplied with current, the armature 5 is attracted by the generated electromagnetic force to the pole face and assumes there the second switching position in which the resetting spring 7 is armed.

Thus, in an energized state of the coil 2 of the electromagnet 1, effected, for example, by means of a current with a constant intensity, the armature 5 approaches the pole face 4 and while doing so, a continuously increasing magnet force is applied thereto which, despite the counter effect of the resetting spring 7, leads to an increase of the velocity of the armature 5 until it impacts on the pole face 4.

To dampen the impact of the armature 5 on the pole face 4, according to the invention a fluid damping unit 9, schematically illustrated in FIG. 1, cooperates with the free end 8 of the plunger element 6. The damping unit 9 essentially includes a cylinder 10 in which a piston 11 is guided and maintained in the illustrated position of rest by a holding spring 12.

A throttle 15 is arranged in the zone of a pressurized fluid return port 14 which opens into the cylinder chamber 13. The throttle 15 which is illustrated only schematically, is connected with a pressurized fluid supply device 17 by means of a return conduit 16.

The pressurized fluid supply device 17 is in communication with the cylinder chamber 13 by means of a pressurized fluid supply conduit 18 which contains a check valve 19. When the piston 11 is moved in the direction of the arrow 20 against the force of the holding spring 12, pressurized fluid is driven by the piston 11 from the cylinder chamber 13 through the throttle 15 into the reservoir of the pressurized fluid supply device 17. When such a moving force against the force of the holding spring 12 is removed, the piston 11 is pulled back into its position of rest by the holding spring 12 and, at the same time, the displaced fluid is replaced via the pressurized fluid supply conduit 18. The pressurized fluid supply device may be constituted by an external construction such as a pressurized fluid system which is present, in any event, in the apparatus served by the actuator, such as a pump or the like, supplying a plurality of damping units of the system with pressurized fluid.

The movable member of the damping unit 9 is situated at a distance S.2 from the free end 8 of the plunger element 6. The distance S.2 is smaller by a predetermined magnitude than the distance S.1 of the armature 5 from the pole face 4 when the armature 5 is in its first switching position in a de-energized state of the coil 2. As a result of this arrangement, the plunger element 6 of the armature 5 enters into an operative engagement with the movable member of the damping unit 9 only shortly before the armature 5 impinges on the pole face 4. Thus, the armature 5 first has a high velocity permitting high switching speeds. The armature 5 is braked by the action of the damping unit 9 only shortly before its impingement on the pole face 4 and thus its velocity at the time of impact on the pole face 4 is reduced.

Figure 2:
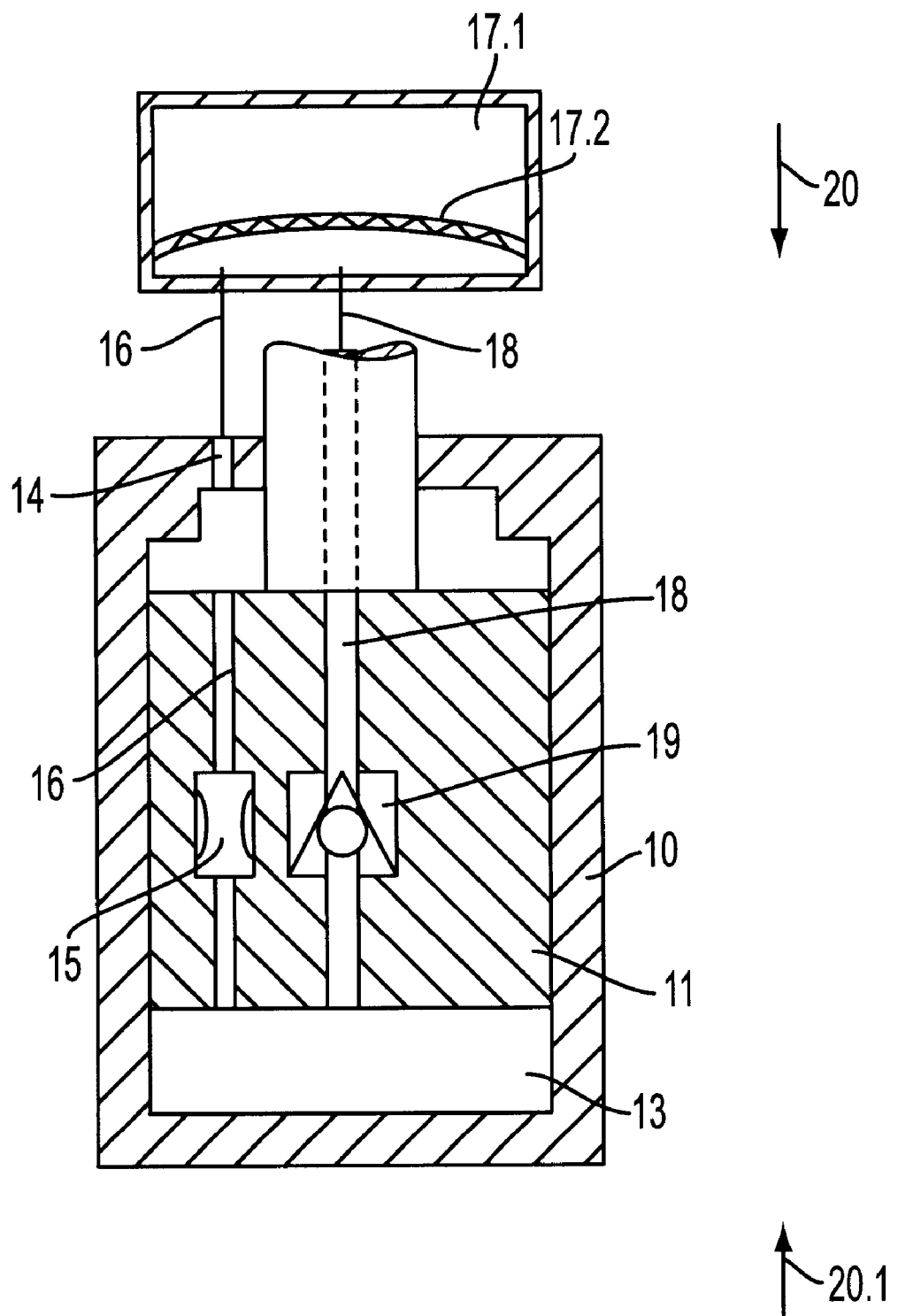
FIG. 2 is a schematic sectional elevational view of a detail of a damping unit according to a preferred embodiment.

FIG. 2 schematically shows a practical embodiment for a damping piston. In the preferred embodiment according to FIG. 2 the cylinder 2 accommodates and guides a piston 11 which has throughgoing bores constituting the return conduit 16 including an integrated throttle 15 and the pressurized fluid supply conduit 18 including an integrated check valve 19. The pressurized fluid return opening 14 in the cylinder 10 is connected with the non-illustrated pressurized fluid supply device via the illustrated extension of the return conduit 16.

If the piston 11 is moved relative to the stationarily held cylinder 10 in the direction of the arrow 20, the damping effect described in connection with FIG. 1 is generated.

The system shown schematically in FIG. 2 would likewise function if the cylinder 10 moves in the direction of the arrow 20.1 relative to the stationarily held piston 11.

It is, however, feasible to design each damping unit as an independent system. This may be effected, for example, by providing that the damping unit has a receiving chamber 17.1 into which the return conduit 16 and the pressurized fluid supply conduit 18 open and which has, for example, a diaphragm 17.2. Upon impacting of the plunger element 6 on the piston rod of the piston 11, the fluid is driven from the cylinder chamber 13 via the throttle 15 into the receiving chamber 17.1. If the piston 11 is moved in the reverse direction by the resetting means, pressurized fluid is drawn back into the cylinder chamber 13 through the check valve 19. The throttle 15 schematically illustrated in FIG. 2 may be designed in a wide variety of ways. Instead of a separate throttle element arranged in the piston, it is feasible to provide suitably dimensioned smooth bores in the piston. It is also feasible to provide a piston which has an outer diameter less than the inner diameter of the cylinder so that between the cylinder wall and the outer cylindrical surface of the piston an annular clearance is maintained which acts as a throttling passage.

Figure 3:
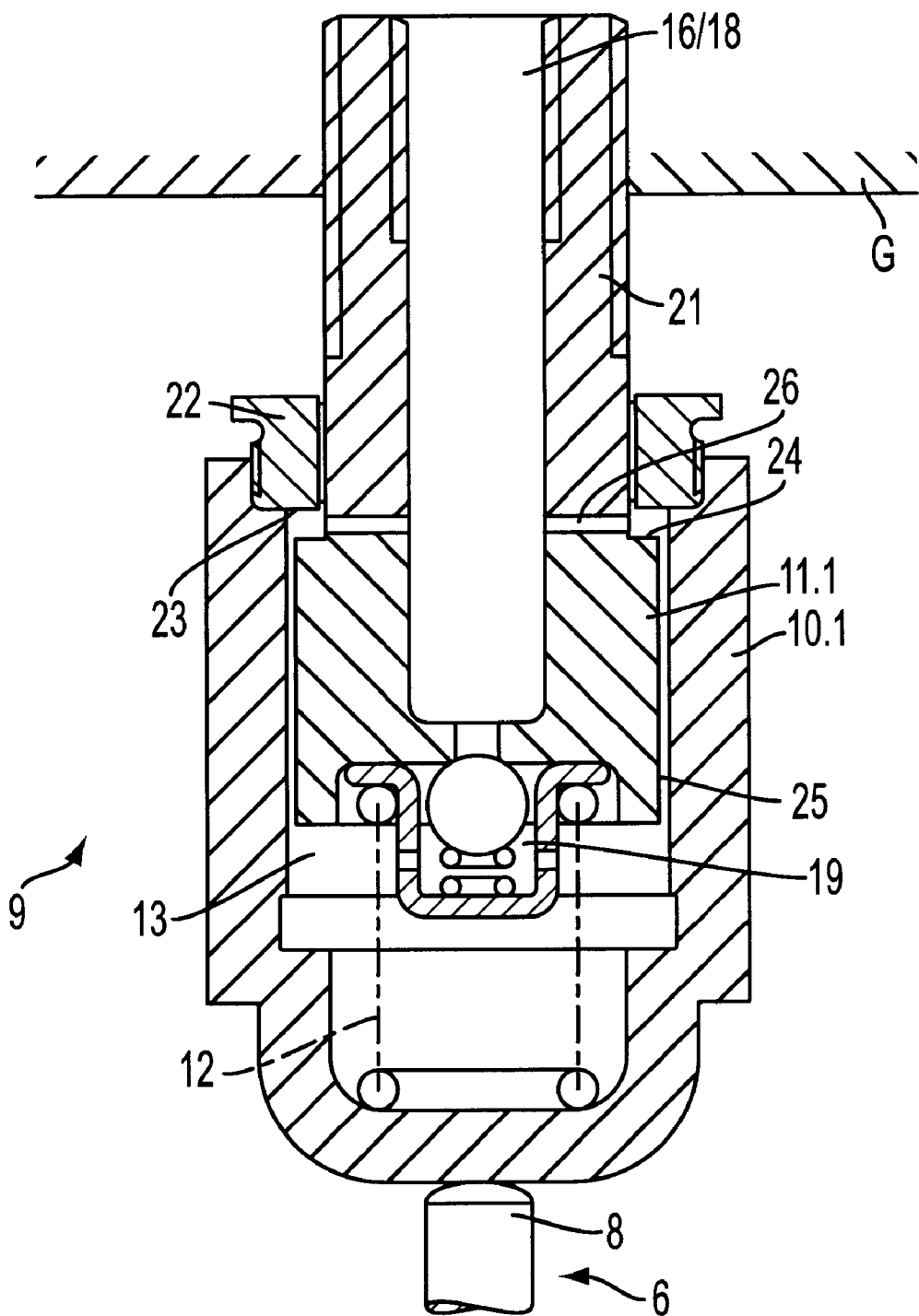
FIG. 3 is a sectional elevational view of another preferred embodiment of a damping unit.

FIG. 3 shows a particularly advantageous embodiment of the damping unit 9. In this embodiment the damping unit 9 is essentially formed of a cylinder 10.1 and a piston 11.1 which in this embodiment is designed as a throttling piston, whose operation will be set forth in greater detail below. The throttling piston 11.1 is fixedly connected with a part G of an otherwise not illustrated actuator housing and constitutes, with its extension 21, the connecting channels 16 and 18 to the pressurized fluid supply device.

The cylinder 10.1 is guided by a sealing and guiding ring 22 on the attachment 21 of the throttling piston 11.1 in an axial direction for reciprocating motion; the surface of the sealing and guiding ring 22 oriented towards the inner cylinder chamber 13 forms an abutment face 23. The cylinder 10.1 is, in its position of rest, pressed by means of the holding spring 12 against a counter shoulder 24 provided on the throttling piston 11.1.

The connecting channel 16, 18 is in a hydraulic communication via the spring biased check valve 19 with the inner cylinder chamber 13.

As soon as the free end 8 of the plunger element 6 impinges on the free end of the cylinder 10.1 as illustrated, the cylinder 10.1 is shifted with respect to the throttling piston 11.1 against the force of the holding spring 12. Since between the outer circumference of the throttling piston 11.1, on the one hand, and the inner cylinder wall of the cylinder 10.1, on the other hand, a clearance 25 is present having a predetermined width, upon relative motion between the cylinder 10.1 and the throttling piston 11.1 pressurized fluid is driven from the inner cylinder chamber 13 through the intermediate space 25. The outflow of such a pressurized fluid quantity driven through the clearance 25 is effected via at least one pressurized fluid return port 26 which is arranged in the plane of the abutment face 24 at the throttling piston 11.1 and provides a connection with the pressurized fluid channel 16, 18.

As soon as the plunger element 6 is disengaged from the cylinder 10.1, the holding spring 12 pushes the cylinder 10.1 back into its position of rest defined by the abutment face 23 in which the pressurized fluid return port 26 is closed. During such a return motion the check valve 19 opens so that the previously displaced fluid quantities are resupplied from the pressurized fluid channel 16, 18.

Figure 4:
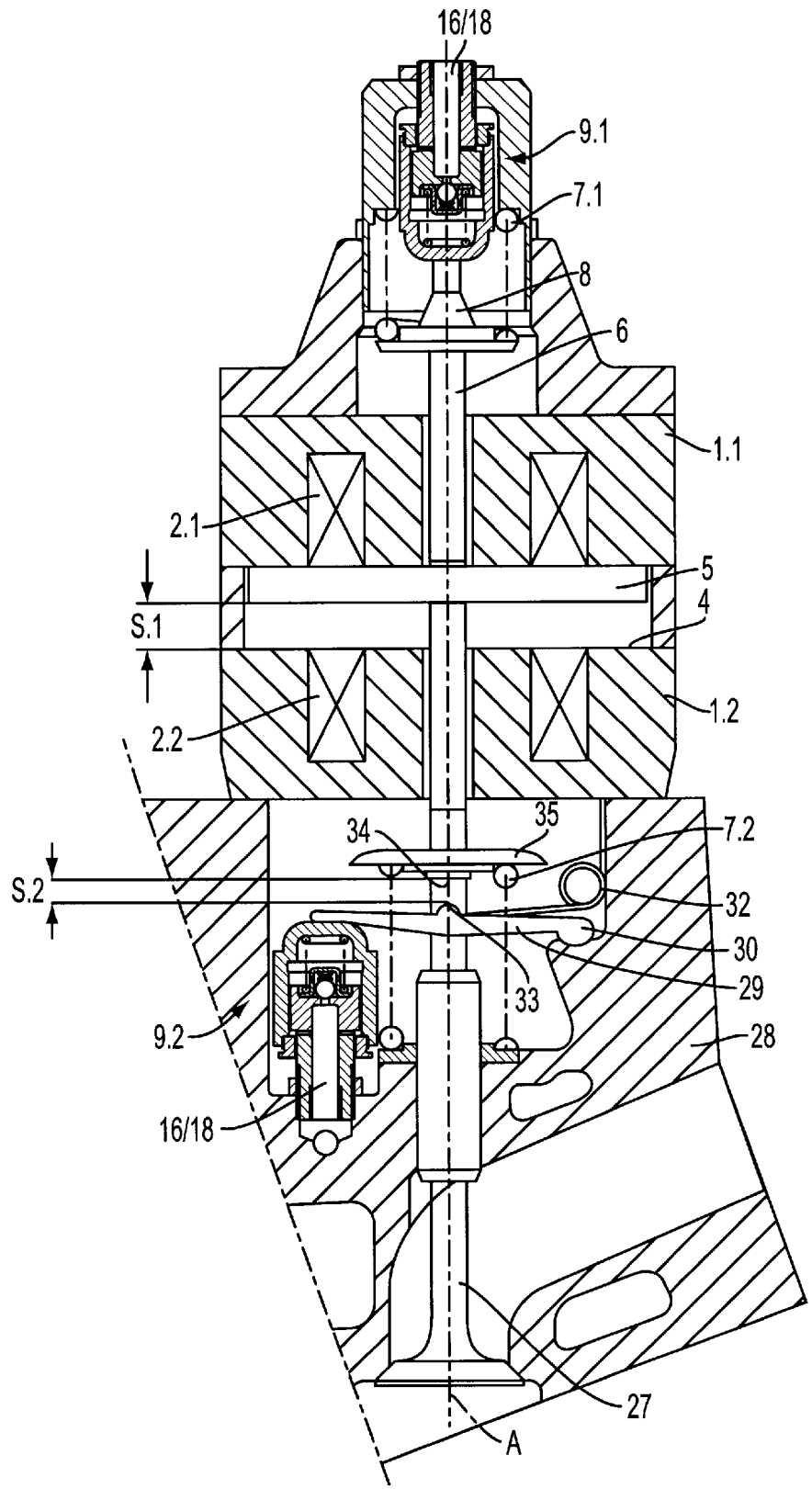
FIG. 4 is a schematic sectional elevational view of a preferred embodiment of an electromagnetic actuator according to the invention for operating a cylinder valve.

FIG. 4 shows a further preferred embodiment, according to which the electromagnetic actuator is used for operating a cylinder valve 27 of a reciprocating piston-type internal-combustion engine. The actuator is mounted on the cylinder head 28 (which also symbolizes the engine) and is formed essentially of two spaced electromagnets 1.1 and 1.2 whose pole faces 4 are oriented towards one another. The armature 5, connected with its plunger element 6, is arranged between the two electromagnets 1.1 and 1.2, whose pole faces define the respective two possible switching positions.

The electromagnet 1.1 serves as a closing magnet whereas the electromagnet 1.2 serves as an opening magnet. In FIG. 4 the closing magnet 1.1 is depicted in an energized state, so that the armature 5, as shown, is held at the pole face of the electromagnet 1.1 against the force of the compressed resetting spring 7.1.

If the electromagnet 1.1 is de-energized and the electromagnet 1.2 is energized, the armature 5 is moved, under the force of the return spring 7.1 and the magnetic force generated by the electromagnet 1.2, in the direction of the pole face 4 of the electromagnet 1.2 against the force of the resetting spring 7.2 and thus the cylinder valve 27 is brought into its open position.

The electromagnet 1.1 is associated with a damping unit 9.1 which cooperates with the free end 8 of the plunger element 6 in alignment with its motion axis A. The construction of the damping unit 9.1 corresponds to that described in connection with FIG. 3.

Since on the side of the electromagnet 1.2 the plunger element 6 cooperates with the cylinder valve in alignment with the motion axis A, in the illustrated embodiment a damping unit 9.2 is arranged at a lateral distance from the motion axis A. The construction and mode of operation of the damping unit 9.2 corresponds to that described in connection with FIG. 3. In order to transmit the damping forces from the damping unit 9.2 to the actuator, a transmission element 29 formed as a lever is provided which with one end 30 is jointed to the cylinder head 28 and with its other end 31 engages the cylinder 10 of the damping unit 9.2. The transmission lever 29 is maintained in its position by means of a spring 32 which may be, for example, a leg spring.

The transmission lever 29 is provided with a protrusion (cam) 33 which, shortly before the armature 5 engages the pole face 4 of the electromagnet 1.2, contacts a collar 34 of a spring seat disk 35 connected with the shank of the cylinder valve 27. The distance between the collar 34 and the cam 33 corresponds to the predetermined distance S.2 as described in connection with FIG. 1 and is thus less than the distance S.1 between the pole face 4 of the electromagnet 1.2 and the corresponding abutment face of the armature 5.

By means of the above-described laterally spaced arrangement of the damping unit 9.2 it is furthermore ensured that the distance S.2 may be set in a precise manner and further, an unintentional lifting of the cylinder valve from its valve seat (that is, from the "valve closed" position) is prevented.

An axial adjustment and thus the adjustment of the distance S.2 for each damping unit 9.1 and 9.2 may be effected by means of a threaded (screw-in) connection between the extension 21 (FIG. 3) and the associated stationary structural components, and the setting may be fixed by a counternut.

Figure 5:
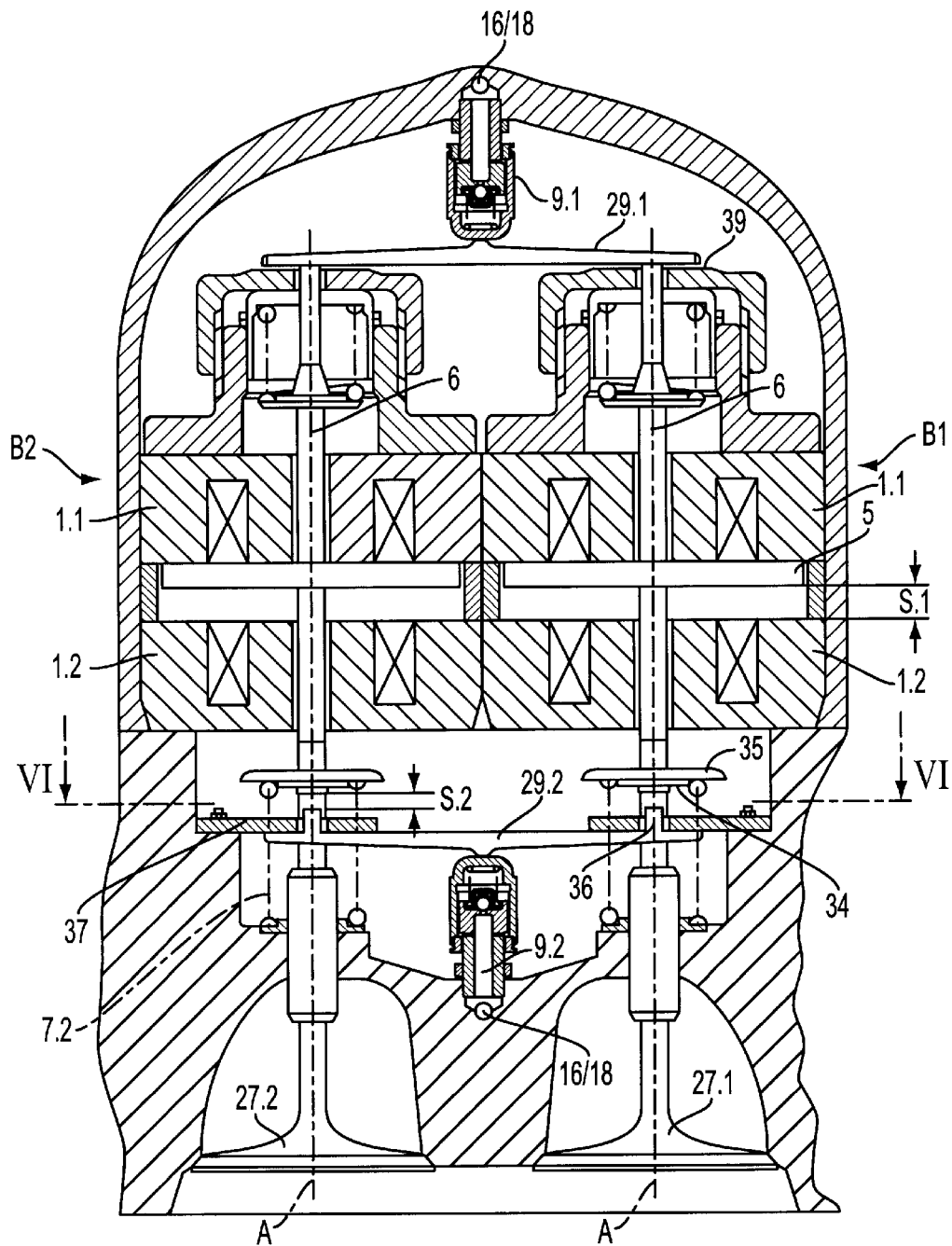
FIG. 5 is a schematic sectional elevational view of a further preferred embodiment of the invention for operating two engine cylinder valves.

FIG. 5 shows in a vertical section two parallel, side-by-side arranged cylinder valves 27.1 and 27.2 of a reciprocating piston-type engine. Each cylinder valve 27.1 and 27.2 is provided with its own electromagnetic actuator B1 and B2. The construction and the mode of operation of each system formed of an actuator and the associated cylinder valve correspond to those discussed in conjunction with the embodiment illustrated in FIG. 4. In the embodiment shown in FIG. 5, both cylinder valves 27.1 and 27.2 may perform the same function, for example, they may be designed as two parallel intake valves or two parallel gas exhaust valves, so that upon operation of the actuators B1 and B2 both cylinder valves may be simultaneously opened or simultaneously closed. It is also feasible, however, to design the cylinder valves 27.1 and 27.2 for different functions, for example, the cylinder valve 27.1 may serve as an intake valve whereas the cylinder valve 27.2 may serve as an exhaust valve.

In the FIG. 5 construction two damping units 9.1 and 9.2 are provided, each serving both the actuator B1 (operating the valve 27.1) and the actuator B2 (operating the valve 27.2). The damping unit 9.1 is coupled to the plunger elements 6 of the actuators B1 and B2, on the side of their respective closing magnets 1.1, by the opposite ends of a force transmission lever 29.1 coupled in its mid region to the cylinder of the damping unit 9.1, whereas the damping unit 9.2 is coupled to the plunger elements 6 of the actuators B1 and B2, on the side of their respective opening magnets 1.2, by the opposite ends of a force transmission lever 29.2 coupled in its mid region to the cylinder of the damping unit 9.2.

Figure 6:
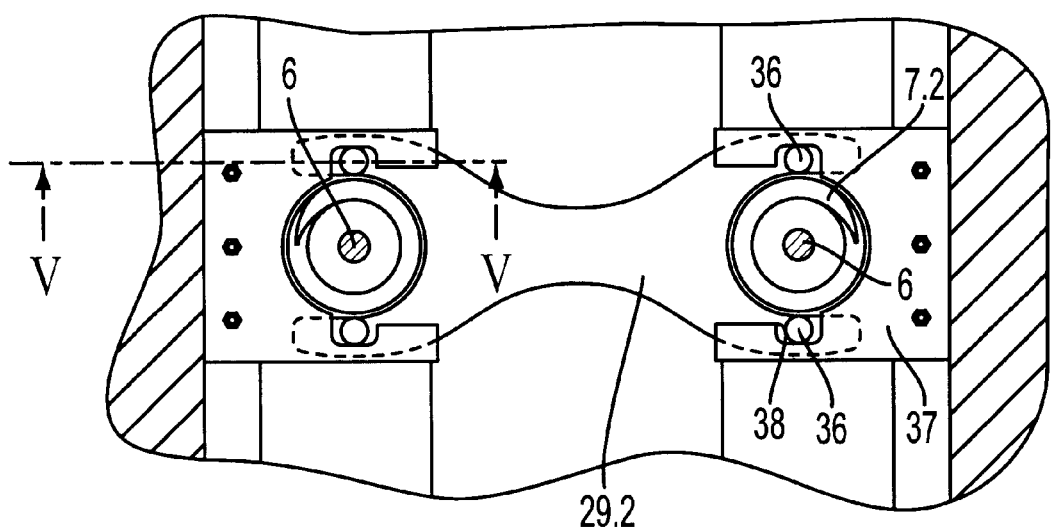
FIG. 6 is a partial sectional view taken along line VI—VI of FIG. 5.

FIG. 6 illustrates details of the articulation of the two ends of the transmission element (lever) 29.2 to the plunger elements 6 of the actuators B1 and B2. As it may be seen in FIG. 5 in conjunction with FIG. 6, the traverse-like transmission element 29.2 has at each end two parallel, side-by-side arranged pins 36 which abut a corresponding collar 34 of the spring seat disk 5 when the associated valve moves into the open position (downward motion of the valve as viewed in FIG. 5). The distance between the end of the pins 36 from the corresponding collar 34 at the spring seat disk 35 corresponds to the distance S.2 as it has been explained in conjunction with FIGS. 1 and 4.

With further reference to FIGS. 5 and 6, a stationary support fork 37 affixed to the cylinder head is associated with each end zone of the transmission element 29.2. Each support fork 37 is provided with corresponding lateral cutouts 38 allowing passage of the pins 36. In the closed position of the cylinder valves as illustrated in FIG. 5, the transmission element 29.2 is pressed by the oil pressure operating in the damping unit 9.2 downwardly against the abutment elements.

The upper transmission element 29.1 is in its illustrated closed position of the cylinder valves 27.1, 27.2 lifted from a corresponding support 39 at the actuators to a slight extent for generating the damping effect. In the open position of the cylinder valves the transmission element 29.1 engages the supports 39.

In the construction according to FIGS. 5 and 6 the working axes of the damping units 9.1 and 9.2 are at identical distances from the motion axes A of the two cylinder valves 27.1 and 27.2.

The articulation between the transmission element and the damping units permits not only a synchronous operation of the two cylinder valves, that is, a simultaneous opening and closing thereof, but makes also possible to maintain, for example, for defined load conditions, one intake valve of a cylinder in a closed position and to operate only the other intake valve of the same cylinder. Such a control is possible even when one of the two cylinder valves is used as an intake valve and the other is used as an exhaust valve.

The two damping units 9.1 and 9.2 are in hydraulic communication with the oil supply device of the associated engine by means of the conduits 16, 18 as explained earlier.

It will be understood that the above description of the present invention is susceptible to various modifications, changes and adaptations, and the same are intended to be comprehended within the meaning and range of equivalents of the appended claims.

What is claimed is:

1. An electromagnetic actuator comprising
    (a) an electromagnet having an energized state for generating an electromagnetic force and a de-energized state; said electromagnet having a pole face;
    (b) an armature movable towards and away from said pole face in a travel path extending from a first end position remote from said pole face to a second end position at said pole face; said armature assuming said second end position in the energized state of said electromagnet;
    (c) a return spring urging said armature away from said pole face and toward said first end position;
    (d) a fluid damping unit for braking a motion of said armature; and
    (e) a plunger element connected to said armature for movement therewith as a unit; said plunger element having a surface portion cooperating with said fluid damping unit to assume a contacting relationship therewith; in one of said first and second end positions of said armature said surface portion of said plunger element being at a clearance from said fluid damping unit; said clearance being less than said travel path, whereby for a first portion of said travel path starting from said one end position, said plunger element is disconnected from, and approaching said fluid damping unit and for a second, terminal portion of said travel path said plunger element is connected to said fluid damping unit for effecting a soft arrival of said armature into the other of said first and second end positions.

2. The electromagnetic actuator as defined in claim 1, further comprising an external pressurized fluid supply device coupled to said fluid damping unit.

3. The electromagnetic actuator as define in claim 1; said plunger element being adapted to be coupled to a setting member of a device served by the electromagnetic actuator; said plunger element having a free end and an axis of motion; said free end constituting said surface portion; said fluid damping unit being oriented toward said free end and being aligned with said axis of motion.

4. The electromagnetic actuator as defined in claim 1; said plunger element being adapted to be coupled to a setting member of a device served by the electromagnetic actuator; said plunger element having a free end and an axis of motion; said free end constituting said surface portion; said fluid damping unit being situated at a lateral distance from said axis of motion; further comprising a transmission element forming part of said fluid damping unit and contacting said free end of said plunger element when said armature arrives at a beginning of said terminal portion of said travel path.

5. The electromagnetic actuator as defined in claim 4, wherein said fluid damping unit has a movable part and means for braking a motion of said movable part by a throttled fluid; further wherein said transmission element comprises a transmission lever and a spring urging said transmission lever into contact with said movable part.

6. The electromagnetic actuator as defined in claim 1, wherein said fluid damping unit comprises
   (a) a cylinder having a cylinder chamber;
   (b) a piston axially slidably received in said cylinder; said piston having a position of rest and being movable relative to said cylinder out of said position of rest by said armature upon motion thereof in said terminal portion of said travel path;
   (c) a holding spring urging said piston into said position of rest;
   (d) fluid conduit means for guiding fluid, displaced by said piston upon motion thereof away from said position of rest, out of said cylinder chamber and for guiding fluid, drawn by said piston upon motion thereof towards said position of rest, into said cylinder chamber;
   (e) throttle means for throttling fluid displaced by said piston upon motion thereof away from said position of rest; and
   (f) a check valve contained in said fluid conduit means for allowing fluid flow from said cylinder chamber solely through said throttle means upon motion of said piston away from said position of rest and for allowing fluid flow therethrough solely upon motion of said piston towards said position of rest.

7. The electromagnetic actuator as defined in claim 6, wherein said throttle means comprises a gap defined together by an inner wall face of said cylinder chamber and an outer wall face of said piston.

8. The electromagnetic actuator as defined in claim 6, wherein said throttle means comprises a throttle constriction contained in said fluid conduit means.

9. The electromagnetic actuator as defined in claim 6, wherein said fluid conduit means comprises a first throughgoing channel provided in said piston and containing said check valve and a second throughgoing channel provided in said piston and containing said throttle means.

10. The electromagnetic actuator as defined in claim 6, wherein said fluid conduit means comprises a throughgoing channel provided in said piston and containing said check valve and means for blocking said throughgoing channel when said piston is in said position of rest and for unblocking said throughgoing channel when said piston is away from said position of rest.

11. The electromagnetic actuator as defined in claim 1, in combination with an internal-combustion engine having a cylinder valve; said electromagnet being a first electromagnet; further comprising a second electromagnet spaced from said first electromagnet and having a pole face defining said first end position of said armature; said return spring being a first return spring; further comprising a second return spring opposing a motion of said armature from said second end position toward said first end position; said plunger element being coupled to said cylinder valve for moving said cylinder valve into open and closed positions; said fluid damping unit being a first fluid damping unit for braking a motion of said armature solely along a terminal portion of said travel path shortly before arrival of said armature into said second end position for effecting a soft arrival of said armature into said second end position; further comprising a second fluid damping unit for braking a motion of said armature solely along a terminal portion of said travel path shortly before arrival of said armature into said first end position for effecting a soft arrival of said armature into said first end position.

12. The electromagnetic actuator as defined in claim 11, further comprising an external oil supply device operatively coupled to said first and second fluid damping units.

13. An internal-combustion engine comprising
   (a) first and second side-by-side arranged cylinder valves each having an open and a closed position;
   (b) first and second electromagnetic actuators for operating said first and second cylinder valves, respectively; each said first and second electromagnetic actuator having
      (1) an electromagnet having an energized state for generating an electromagnetic force and a de-energized state; said electromagnet having a pole face;
      (2) an armature movable towards and away from said pole face in a travel path extending from a first end position remote from said pole face to a second end position at said pole face; said armature assuming said second end position in the energized state of said electromagnet;
      (3) a return spring urging said armature away from said pole face and toward said first end position; and
      (4) a plunger element connected to said armature for movement therewith; said plunger element being coupled to a respective said first and second cylinder valve for moving said respective cylinder valve into said open and closed positions; and
   (c) a common fluid damping unit for braking a motion of the armatures of said first and second electromagnets along a terminal portion of said travel path shortly before arrival of said armatures into at least one of said end positions for effecting a soft arrival of the armatures into said one end position; said common fluid damping unit being coupled with the plunger element of said first and second electromagnets.

14. The internal-combustion engine as defined in claim 13, wherein each said plunger element has a free end; further comprising a transmission lever cooperating with the free end of each said plunger element and being supported by said common fluid damping unit.

15. The internal-combustion engine as defined in claim 14, wherein said transmission lever is articulated to each said plunger element and to said common fluid damping unit.

* * * * *